United States Patent [19]

Nagumo

[11] 4,238,765
[45] Dec. 9, 1980

[54] COLOR TELEVISION CAMERA ADAPTED FOR ELIMINATION OF SPURIOUS LUMINANCE SIGNAL COMPONENTS

[75] Inventor: Fumio Nagumo, Yokohama, Japan

[73] Assignee: Sony Corporation, Tokyo, Japan

[21] Appl. No.: 10,821

[22] Filed: Feb. 9, 1979

[30] Foreign Application Priority Data

Feb. 13, 1978 [JP] Japan .................................. 53/15074

[51] Int. Cl.³ ............................................. H04N 9/09
[52] U.S. Cl. ..................................................... 358/43
[58] Field of Search .............................. 358/37, 43, 44

[56] References Cited

U.S. PATENT DOCUMENTS

| 4,054,906 | 10/1977 | Yamanaka | 358/43 |
| 4,069,501 | 1/1978 | Yamanaka | 358/44 |
| 4,141,037 | 2/1979 | Nishimura et al. | 358/44 |
| 4,149,182 | 4/1979 | Yamanaka et al. | 358/43 |
| 4,167,755 | 9/1979 | Nagumo | 358/213 |

Primary Examiner—Robert L. Richardson
Attorney, Agent, or Firm—Hill, Van Santen, Steadman, Chiara & Simpson

[57] ABSTRACT

A checker-board pattern color coding filter is employed in a color television camera using solid state imaging devices. A luminance signal component is controlled in such a manner as to exclude spurious signals based on the particular pattern of an object image detected by analyzing the conditions of dot-sequential color signals of two adjacent lines.

7 Claims, 11 Drawing Figures

FIG. 3
FIG. 4
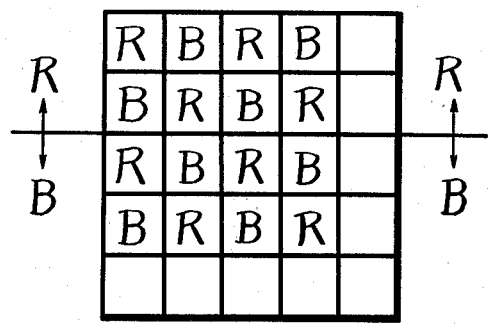
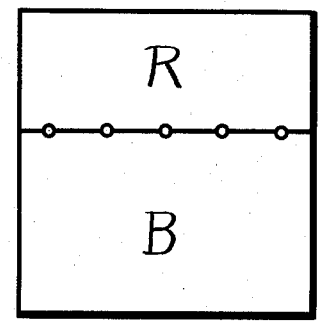
FIG. 5
FIG. 6
FIG. 8
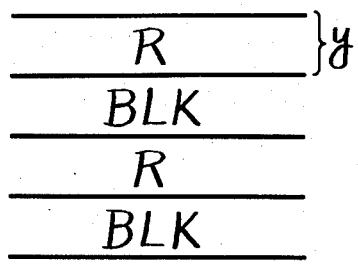
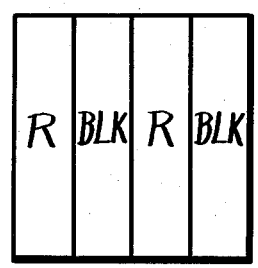
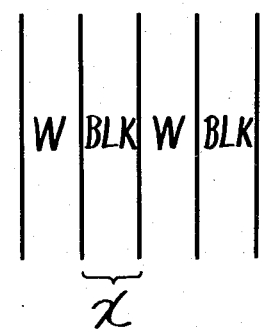

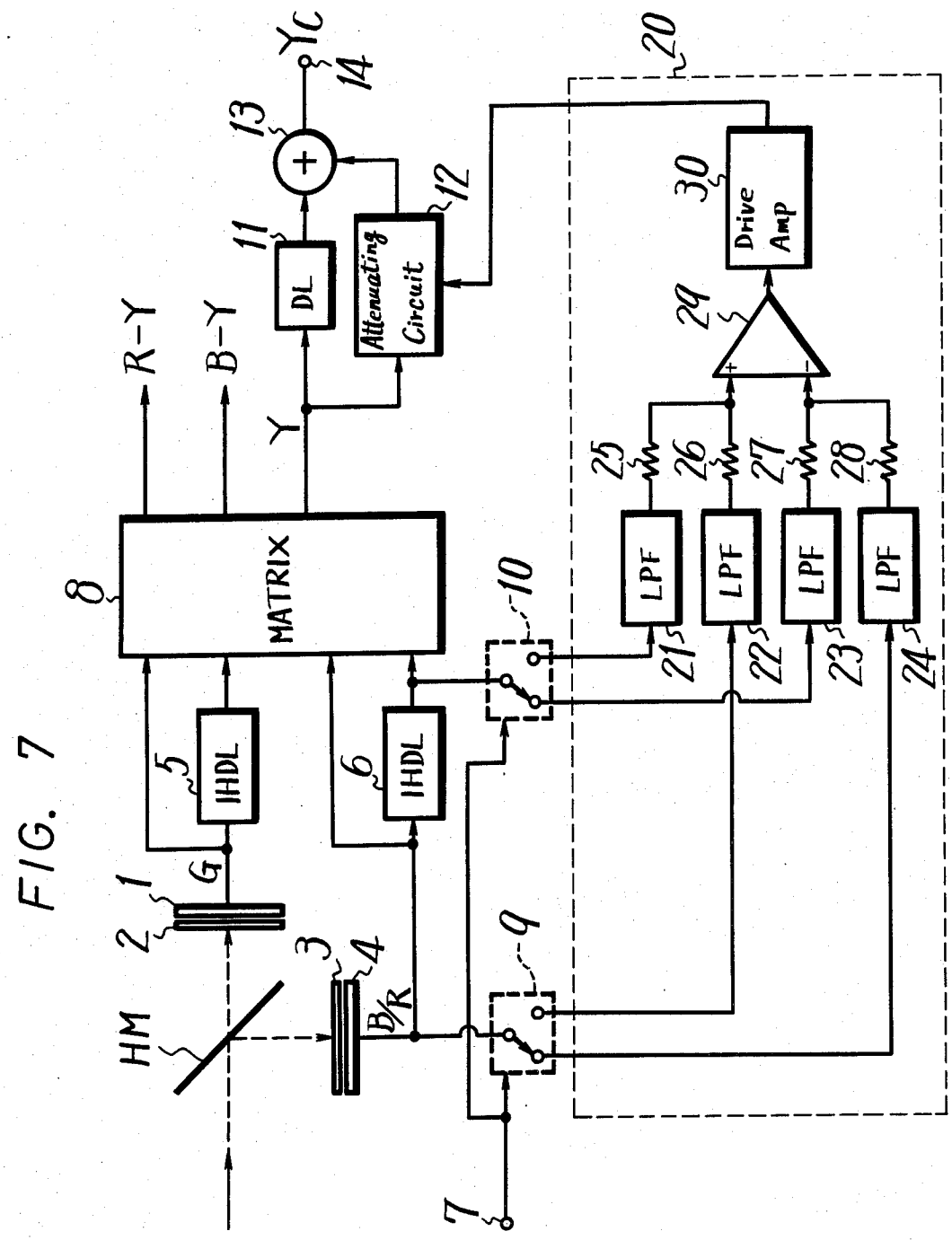

COLOR TELEVISION CAMERA ADAPTED FOR ELIMINATION OF SPURIOUS LUMINANCE SIGNAL COMPONENTS

BACKGROUND OF THE INVENTION

1. Field of the Invention

This invention relates generally to a signal processing circuit for a color image pickup system, and more particularly to such a signal processing circuit in which spurious signals in a synthesized luminance signal are suppressed.

2. Description of the Prior Art

Recently, an investigation has been carried out on a color television camera system in which solid state imaging devices such as a CCD (charge-coupled device) are used. In this case, as a color coding filter to be used therein, various kinds of filters can be considered. An example of the color coding filters is such that two colors such as red and blue colors are arranged in a checker-board pattern. When the checker-board pattern color coding filter is used in an imaging device, a dot-sequential color signal is developed from the imaging device.

FIG. 1 shows a part of a color image pickup system in which two imaging devices are used. In the example of FIG. 1, in front of a first imaging device 1 there is located a green color (G) filter 2 and in front of a second imaging device 3 there is located a red-blue color filter 4 which consists of red (R) and blue (B) color filter elements arranged in a checker-board pattern. In this case, each of the colors of the color filter elements G, R and B of the filters 2 and 4 corresponds to the picture elements of the respective imaging devices 1 and 3, and the alignment or arranging pitch of the picture elements is selected as x in the horizontal direction and y in the vertical direction, respectively.

In this case, the two imaging devices 1 and 3 are shifted or deviated by x/2 in the horizontal direction with each other with respect to a focussed image. The reading out of signals from the respective imaging devices 1 and 3 are carried out in association with the television synchronization signal. Thus, from the imaging device 1 there is derived a green signal G which has frequency and phase characteristics shown in FIG. 2A. In this case, the sampling frequency is selected as $1/P_x$ where where $P_x$ is the time which corresponds to a time in which the scanning of the television signal moves the distance or pitch x.

In FIG. 2A, the solid line represents the base band component of the green signal G and the one-dot chain line represents its side band component, respectively.

From the other imaging device 3 there are derived dot-sequential red and blue color signals R and B which have frequency and phase characteristics shown in FIGS. 2B and 2C, respectively.

Since the imaging devices 1 and 3 are shifted by x/2 as set forth above, the phases of the side band components are different by 180° between the color signals G and B/R at the frequency $1/P_x$, where B/R represents the dot-sequential color signal of red and blue colors. FIGS. 2B and 2C are signals from the adjacent lines.

In the color coding filter 4, the red and blue color filter elements are arranged in a checker-board pattern as set forth above, so that the phase relation of the color signals B and R is inversed at the frequency of $1/2P_x$.

By way of example, a luminance signal $S_Y$ is synthesized from the color signals G, R and B along the following equation (1).

$$S_Y = \tfrac{1}{2}\{(G_n + G_{n+1}) + \tfrac{1}{2}(R_n + R_{n+1}) + \tfrac{1}{2}(B_n + B_{n+1})\} \quad (1)$$

The synthesis by the equation (1) is determined in view of the phase relations of FIGS. 2A to 2C. In case of a colorless or black and white object, the side band components of carrier frequencies $1/P_x$ and $1/2P_x$ are cancelled. In this case, for example, a white object, it is of course selected to satisfy the relation of G=B=R.

In case of a colored object, if there is a vertical correlation in colors, at least side band components of $1/2P_x$ are cancelled and hence almost all of spurious signals, which will be otherwise mixed into the luminance channel, can be suppressed. However, if there is no color vertical correlation, it is impossible to suppress the generation of a quasi-signal (spurious signal).

For example, an object with a pattern shown in FIG. 3, i.e., its upper half being red and its lower half being blue will now be considered. In this case, it is sufficient that only side band components generated with the frequency $1/2P_x$ as the center are cancelled.

When the above object is picked up by the above color image pickup system, only a red signal $R_n$ is derived from a line n and a blue signal $B_{n+1}$ is derived from a line n+1. Thus, a luminance signal $S_Y$ of this case is expressed as follows:

$$S_Y = \tfrac{1}{2}(R_n + B_{n+1}) \quad (2)$$

As may be apparent from FIGS. 2B and 2C, the phases of the carriers with the frequency $1/2P_x$ are the same and hence the carriers are emphasized. Thus, even though the vertical correlation is utilized, the side band components generated with the frequency $1/2P_x$ as the center can not be cancelled and a spurious signal is reproduced as a dot-like pattern as shown in FIG. 4.

OBJECTS AND SUMMARY OF THE INVENTION

Accordingly, an object of the invention is to provide a novel signal processing circuit for a color television camera.

Another object of the invention is to provide a signal processing circuit for a color television camera in which a checker-board pattern color coding filter is used.

In a color television camera in which a checker-board pattern color coding filter is used, the side band cancelling technique, which utilizes the vertical correlation is employed in order to improve the band width of a luminance signal. In this case, in order to suppress the spurious signal the status of vertical correlation is checked. For a screen which has no vertical correlation, no band width improvement by the side band cancelling technique is performed.

Further, when an object image includes a vertical stripe, there may be a case that even though there exists a vertical correlation, no band width improvement is performed. Such an error operation can be avoided by detecting a pattern in the horizontal direction.

According to an aspect of the present invention, there is obtained a signal processing circuit adapted to a color image pickup system which employs a color coding filter of the type having at least first and second color filter elements in a checker-board pattern, which comprises means for deriving dot-sequential color signals corresponding to said first and second colors from said color image pickup system, means for generating luminance signal components which partly includes said dot-sequential color signal components, first mixing means for mixing first color signals of a first line with second color signals of a succeeding line, second mixing means for mixing second color signals of said first line with first color signals of said succeeding line, means for generating a first control signal by comparing respective outputs of said first and second mixing means, and means for controlling said luminance signal in response to said first control signal.

The other objects, features and advantages of the present invention will become apparent from the following description taken in conjunction with the accompanying drawings through which the like reference numerals and letters designate the same elements and parts.

BRIEF DESCRIPTION OF THE DRAWINGS

FIGS. 3 to 6 and FIGS. 8, 10 and 11 are schematic diagrams used for explaining quasi-signals, respectively; and FIGS. 7 and 9 are respectively systematic diagrams showing embodiments of the invention.

DESCRIPTION OF THE PREFERRED EMBODIMENTS

Figure 1:
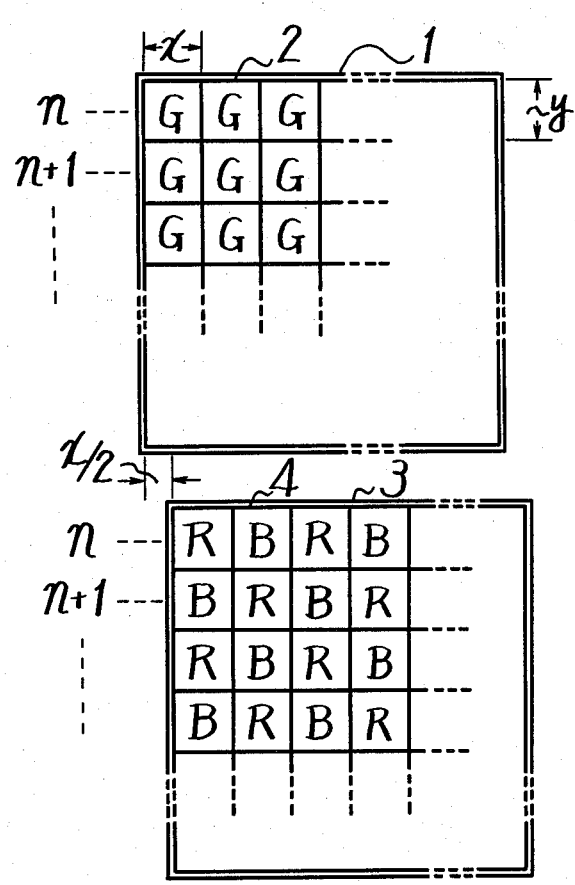
FIG. 1 is a schematic diagram showing the arrangement of picture elements of imaging devices used in a color image pickup system.
Figure 2A:
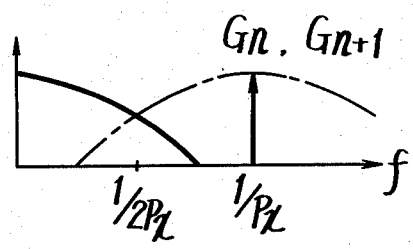
FIGS. 2A, 2B and 2C are graphs showing the frequency and phase characteristics of color signals.
Figure 2B:
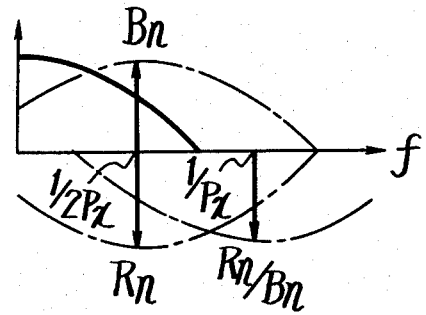
Figure 2C:
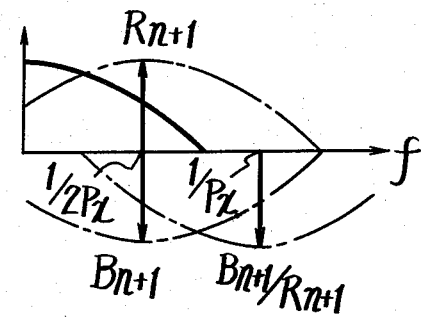

FIG. 7 is a systematic diagram showing a preferred embodiment of the present invention. In this example, the light from an object (not shown) is introduced to a half mirror HM and then split thereby into two lights. One of the split images is focussed on a CCD imager 1 through a green color filter 2, while the other split light is focussed through a red-blue color filter 3 on a CCD imager 4. The above-mentioned construction of the invention is substantially the same as that described in connection with FIGS. 1 and 2A to 2C. Thus, a green color signal G is delivered from the CCD imager 1 and a red-blue dot-sequential color signal R/B is delivered from the CCD imager 4, respectively.

The green color signal G and dot-sequential color signal R/B are supplied to delay circuits 5 and 6 to be delayed by 1H (one horizontal scan time), respectively. The delayed signals from the delay circuits 5 and 6 and also non-delayed green color signal G and dot-sequential signal R/B are fed to a matrix circuit 8 in which a luminance signal Y which is the same as that defined by the equation (1) is provided. The luminance signal Y is fed to a delay circuit 11 for the aperture correction and to an attenuating circuit 12 which includes a band pass filter for passing therethrough the frequency band containing a spurious signal or quasi-signal. The outputs from the delay circuit 11 and attenuating circuit 12 are fed to an adding circuit 13 to be added or composed. An output terminal 14 led out from the adding circuit 13 serves an input terminal of an encoder (not shown).

The attenuating, which comprises of a series-connected gain controlled amplifier and a band pass filter of $1/2P_x$, circuit 12 is used to suppress the quasi-signal or spurious signal and its gain A can be controlled over the range of $-A$ and $+A$. When the quasi-signal appears, the gain A of the attenuating circuit 12 is controlled in accordance with the level of the quasi-signal to suppress the quasi-signal in the output from the adding circuit 13. It is not necessary that the manner for supressing the spurious signal or quasi-signal be limited to the above example, but it is possible that for attenuating circuit 12 to be connected in series to the signal transmission line of the delay circuit 11 to directly suppress the spurious signal. That is, since the spurious signal is generated with the frequency $1/2P_x$ as the center, an electrically controllable trap circuit with the frequency $1/2P_x$ can be utilized.

The attenuating circuit 12 is controlled by a circuit 20. The spurious signal is generated when the color of an object is varied in the vertical direction. Especially, in the example of FIG. 3, there is the relation of $R_n \neq B_n$ ($R_{n+1} \neq B_{n+1}$). Therefore, with the present invention, the operation expressed by the following equation (3) is carried out.

$$\Delta = (R_n + B_{n+1}) - (B_n + R_{n+1}) \qquad (3)$$

When an output $\Delta$ is not zero ($\Delta \neq 0$), which represents whether a variation in the vertical direction exists or not, the color of the object is changed in the vertical direction. Therefore, at this time the attenuating circuit 12 is controlled by the circuit 20 to suppress the spurious signal.

In the example of FIG. 7, the output from the delay circuit 6 is fed to a first switch circuit 10 in which the dot-sequential signal $R_n/B_n$ is separated into color signals $R_n$ and $B_n$, while the signal R/B from the CCD imager 4 is fed to a second switch circuit 9 to be separated into color signals $R_{n+1}$ and $B_{n+1}$. In this case, the switch circuits 9 and 10 are supplied through a terminal 7 from a synchronizing signal source (not shown) with a switch pulse which has the frequency $1/P_x$ and duty cycle of 50%. The red color signal $R_n$ from the switch circuit 10 is fed to a low pass filter 21 and the blue color signal $B_{n+1}$ from the switch circuit 9 is fed to a low pass filter 22. The output signals from the low pass filters 21 and 22 are added together through resistors 25 and 26 and then fed to one of the input terminals of a comparator circuit 29 which is formed of a differential amplifier 29.

Similarly, the blue and red color signals $B_n$ and $R_{n+1}$ from the switch circuits 10 and 9 on the adjacent lines are fed to low pass filters 23 and 24, respectively, and then added together through resistors 27 and 28, which is then added to the other input terminal of the comparator circuit 29. In this case, the cut-off frequency of the low pass filters 21 to 24 are selected as, for example, 500 KHz to 1 MHz, respectively.

With the control circuit 20 constructed as above, the operation defined by the above equation (3) is carried out, so that when an object such as shown in FIG. 3 is picked up, the compared output $\Delta$ is obtained from the comparator circuit 29. This compared output $\Delta$ is applied through a drive circuit 30 to the attenuating circuit 12 as its control signal. As a result, at the time when the compared output $\Delta$ is not zero ($\Delta \neq 0$), the gain A of the attenuating circuit 12 is controlled in the direction $-A$ in accordance with the magnitude of the output $\Delta$, so that the output of the adding circuit 13, i.e., spurious signal is attenuated in accordance with the compared output $\Delta$. When the gain A of the attenuating circuit 12 is adjusted to $-A$, the spurious signal is made zero completely. With the control operation, the spurious signal is suppressed and hence the dot-pattern on the boundary line disappears. Even in case of a pattern shown in FIG. 5, its picture becomes an original one.

If the pattern of an object is a black and white vertical stripe pattern and its arranging pitch is the same as x of the picture elements as shown in FIG. 8, the output signals become such that on the n line $R_n \neq 0$ and $B_n = 0$, while on the line $n+1$ $R_{n+1} = 0$ and $B_{n+1} \neq 0$. Thus, if the relations are instituted into the equation (3), the compared output $\Delta$ is not zero ($\Delta \neq 0$). In this case, however, since the color of the object in the vertical direction is not varied, when the object with the pattern shown in FIG. 8 is picked up, the luminance signal Y is automatically suppressed.

Figure 9:
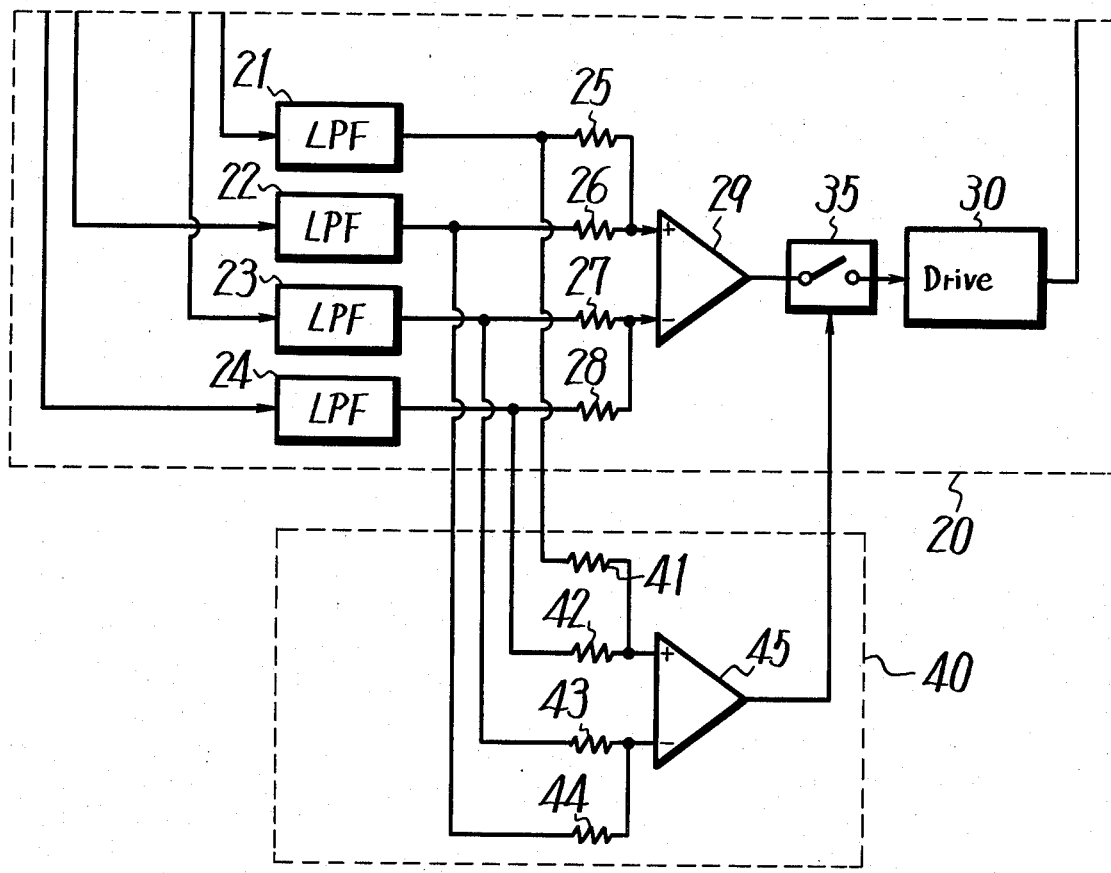

The avoid such an error of operation, it is sufficient to provide an error operation avoiding circuit 40 as shown in FIG. 9. That is, when the color of an object is not varied in the vertical direction even if the compared output $\Delta$ is not zero ($\Delta \neq 0$), the following relation is established.

$$\left.\begin{array}{l} R_n = B_{n+1} \neq 0 \\ B_n = R_{n+1} = 0 \\ \text{or} \\ B_n = R_{n+1} \neq 0 \\ R_n = B_{n+1} = 0 \end{array}\right\} \quad (4)$$

Therefore, in the example of FIG. 9, the following operation is carried out.

$$\Delta' = (R_n + R_{n+1}) - (B_n + B_{n+1}) \quad (5)$$

If there is no variation in the vertical direction, $\Delta'$ is zero ($\Delta' = 0$). Thus, when $\Delta' = 0$ the compared output $\Delta$ is controlled to avoid any erroneous operation.

In order to carry out the operational processing defined by the equation (5), the error operation avoiding circuit 40 includes a comparator circuit 45. The output signals from the low pass filters 21 and 24 are added through resistors 41 and 42 and then fed to the comparator circuit 45 at its one input terminal, while the output signals from the low pass filters 22 and 23 are added through resistors 43 and 44 and then fed to the comparator circuit 45 at its other input terminal. Thus, the comparator circuit 45 achieves the operation of the equation (5) and then produces the compared output $\Delta'$, which is fed to a switch circuit 35 provided between the comparator circuit 29 and the drive circuit 30 to control the switch circuit 35. That is, only when $\Delta' = 0$ the switch circuit 35 is made OFF (opened).

Figure 10:
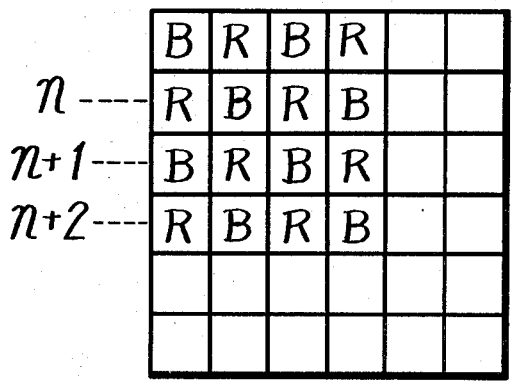

It is possible that the above erroneous operation can be avoided without providing the error operation avoiding circuit 40. To this end, the operation by the following equation (6) is performed by using the output signals from n and n+1 lines (Refer to FIG. 10).

$$\Delta'' = (R_n + B_{n+2}) - (B_n + R_{N+2}) \quad (6)$$

In case of the object shown in FIG. 3, the value $\Delta''$ is not zero ($\Delta'' \neq 0$), while in the case of the object shown in FIG. 8, $\Delta'' = 0$. Thus, in the former case the spurious signal can be positively suppressed and in the latter case the erroneous operation can be avoided.

According to the present invention described as above, the spurious signal can be suppressed by the simple construction without any deterioration of a reproduced picture and with good reproducibility.

Figure 11:
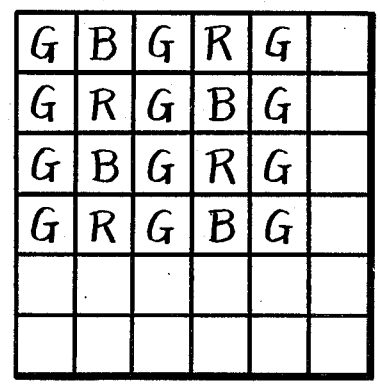

The above description is given on the example of the invention in which two imaging devices are used. However, in case of using a single imaging device, if a color filter consisting of color filter elements arranged in a checker-board pattern shown in FIG. 11 is used in front of the single imaging device, the spurious signal can be suppressed by similarly processing the signals.

Further, in place of blue color filter elements magenta color filter elements can be used.

The following patents owned by the Assignee of the present application disclose the phase relationship of picture elements in color image pickup systems. For more complete understanding of this application reference may be made to such patents which are hereby incorporated by reference. These patents are U.S. Pat. No. 4,069,501 which issued on Jan. 17, 1978, U.S. Pat. No. 4,149,182 which issued on Apr. 10, 1979 filed Jan. 25, 1978, U.S. Pat. No. 4,141,037 which issued on Feb. 20, 1979, and U.S. Pat. No. 4,167,755 which issued on Sept. 11, 1979 and U.S. Pat. No. 4,054,906 which issued on Oct. 18, 1977. Copies attached.

It will be apparent that many modifications and variations could be effected by one skilled in the art without departing from the spirit or scope of the novel concepts of the present invention.

I claim as my invention:

1. A signal processing circuit adapted to a color image pick up system which employs a color coding filter of the type having at least first and second color filter elements in a checker-board pattern, comprising:
    (a) means for deriving dot-sequential color signals corresponding to said first and second colors from said color image pickup system;
    (b) means for generating luminance signal components which partly includes said dot-sequential color signal components;
    (c) first mixing means for mixing first color signals of a first line with second color signals of a succeeding line;
    (d) second mixing means for mixing second color signals of said first line with first color signals of said succeeding line;
    (e) means for generating a first control signal by comparing respective outputs of said first and second mixing means; and
    (f) means for controlling said luminance signal in response to said first control signal.

2. A signal processing circuit according to claim 1, wherein said first color is blue and said second color is red.

3. A signal processing circuit according to claim 1, further comprising:
    (a) third mixing means for mixing first color signals of said first line with first color signals of said succeeding line;
    (b) fourth mixing means for mixing second color signals of said first line with second color signals of said succeeding line;
    (c) means for generating second control signal by comparing respective outputs of said third and fourth mixing means; and
    (d) control suppressing means for suppressing said control of the luminance signal by said first control signal in response to said second control signal.

4. A color image pickup system comprising a signal processing circuit including a color coding filter formed of first and second color filter elements arranged in a checker-board pattern, means for deriving dot-sequential color signals corresponding to said first and second colors in said color image pickup system, means for generating luminance signal components which partly include said dot-sequential color signals, first mixing means for mixing first color signals of a first line with second color signals of a succeeding line, second mixing means for mixing second color signals of said first line with first color signals of said succeeding line, means for generating a first control signal by comparing respective outputs of said first and second mixing means, and means for controlling said luminance signal in response to said first control signal.

5. A signal processing circuit adapted to a color image pickup system which employs a color coding filter of the type having at least first and second color filter elements in a checker-board pattern, comprising:
(a) means for deriving dot-sequential color signals corresponding to said first and second colors from said color image pickup system;
(b) means for generating luminance signal components which partly includes said dot-sequential color signal components;
(c) means for analyzing said dot-sequential color signals derived from said deriving means;
(d) means for generating a control signal from results of said analyzing means; and
(e) means for controlling transmission characteristics for said luminance signal in response to said first control signal.

6. A signal processing circuit according to claim 5, wherein said analyzing means analyzes color signals of adjacent two lines simultaneously.

7. A signal processing circuit according to claim 6, wherein said analyzing means includes first mixing means and second mixing means, and said first mixing means serves to mix first color signals of a first line with second color signals of a succeeding line and said second mixing means serves to mix second color signals of said first line with first color signals of said succeeding line.

* * * * *